(12) United States Patent
Silverberg

(10) Patent No.: US 9,837,003 B2
(45) Date of Patent: Dec. 5, 2017

(54) FREE-STANDING VERTICAL STRUCTURES FOR DISPLAYING BOTANIC MEDIA

(75) Inventor: H. Gene Silverberg, Glencoe, IL (US)

(73) Assignee: Sage Vertical Garden Systems, LLC, Chicago, IL (US)

( * ) Notice: Subject to any disclaimer, the term of this patent is extended or adjusted under 35 U.S.C. 154(b) by 324 days.

(21) Appl. No.: 12/661,848

(22) Filed: Mar. 24, 2010

(65) Prior Publication Data

US 2011/0036010 A1 Feb. 17, 2011

Related U.S. Application Data

(60) Provisional application No. 61/233,188, filed on Aug. 12, 2009.

(51) Int. Cl.
*A01G 9/12* (2006.01)
*A01G 27/00* (2006.01)
(Continued)

(52) U.S. Cl.
CPC ............. *G09F 19/22* (2013.01); *A01G 9/022* (2013.01); *A01G 9/12* (2013.01); *A01G 27/00* (2013.01); *A01G 31/06* (2013.01); *G09F 1/06* (2013.01); *G09F 1/065* (2013.01); *G09F 15/005* (2013.01); *G09F 15/0068* (2013.01); *G09F 15/0075* (2013.01)

(58) Field of Classification Search
USPC .... 47/39, 47, 62 R, 63, 65, 65.5, 66.1, 66.3, 47/66.5, 66.6, 73, 77, 82–87
See application file for complete search history.

(56) References Cited

U.S. PATENT DOCUMENTS 320,362 A * 6/1885 Judd ............................... 108/59
1,345,196 A * 6/1920 Kennedy et al. ................. 52/38
(Continued)

FOREIGN PATENT DOCUMENTS

| CN | 2916029 | 6/2006 |
|---|---|---|
| CN | 201087519 | 1/2008 |

(Continued)

OTHER PUBLICATIONS

International Search Report and Written Opinion of the International Search Authority dated Oct. 5, 2010.
(Continued)

*Primary Examiner* — David Parsley
(74) *Attorney, Agent, or Firm* — James P. Hanrath; Much Shelist, P.C.

(57) ABSTRACT

A free-standing vertical structure is described including at least one wall structure having a plurality of live plants removably secured thereto. The wall structures may also include non-botanic media in combination with the plurality of plants such as traditional media, to form a new mixed media format for conveying information, herein referred to as botanic media. The plurality of plants may be configured to surround the non-botanic media to create a frame or border. The plants may also be arranged and configured to display information themselves. The non-botanic media and/or plants are configured on the wall structure to convey information readily perceivable by a passerby. The plants are preferably hydroponically-fed with nutrients and water from an irrigation system.

23 Claims, 15 Drawing Sheets

(51) Int. Cl.
*A01G 31/06* (2006.01)
*G09F 19/22* (2006.01)
*A01G 9/02* (2006.01)
*G09F 1/06* (2006.01)
*G09F 15/00* (2006.01)

(56) References Cited

U.S. PATENT DOCUMENTS

| | | | |
|---|---|---|---|
| 2,279,735 A | | 4/1942 | Gates |
| 2,514,536 A | | 7/1950 | Burney |
| 3,015,024 A | * | 12/1961 | Charchan et al. ............ 362/227 |
| 4,001,959 A | * | 1/1977 | Grendahl ........................ 40/720 |
| 4,295,296 A | | 10/1981 | Kinghorn |
| 4,499,688 A | | 2/1985 | Droll |
| 4,756,120 A | * | 7/1988 | Arledge ........................ 47/59 R |
| 5,373,662 A | | 12/1994 | Rwickstrom |
| 5,598,662 A | * | 2/1997 | Droste .............................. 47/39 |
| 5,617,673 A | * | 4/1997 | Takashima ........................ 47/60 |
| 5,675,931 A | * | 10/1997 | Wasserman ...................... 47/39 |
| 6,296,180 B1 | | 10/2001 | Blizzard ........................ 232/38 |
| 6,470,625 B1 | | 10/2002 | Byun |
| 6,513,284 B1 | * | 2/2003 | Sandlin ........................ 47/66.6 |
| 6,557,806 B2 | * | 5/2003 | Davies ........................ 248/121 |
| 6,840,008 B1 | | 1/2005 | Bullock et al. |
| 7,040,053 B1 | * | 5/2006 | Beesley ............................ 47/39 |
| 7,243,460 B2 | | 7/2007 | Darlington |
| 7,536,829 B2 | | 5/2009 | Genma |
| 7,722,000 B2 | * | 5/2010 | Sherburne ................... 248/27.8 |
| 7,832,144 B2 | * | 11/2010 | Corradi ................. A01G 31/02 47/59 S |
| 2002/0029517 A1 | * | 3/2002 | Hutchinson et al. .............. 47/39 |
| 2004/0035049 A1 | * | 2/2004 | McLarty ............................ 47/39 |
| 2005/0120930 A1 | | 6/2005 | Kang |
| 2006/0156624 A1 | | 7/2006 | Roy et al. |
| 2006/0168881 A1 | * | 8/2006 | Straumietis ................... 47/62 R |
| 2006/0201061 A1 | | 9/2006 | Caron et al. |
| 2007/0199241 A1 | | 8/2007 | Peleszezak |
| 2007/0245624 A1 | * | 10/2007 | Padden .............................. 47/39 |
| 2008/0000153 A1 | | 1/2008 | Sugiyama et al. |
| 2008/0110086 A1 | * | 5/2008 | Julia ...................... A01G 9/025 47/64 |
| 2008/0295402 A1 | | 12/2008 | Bindschedler et al. |
| 2008/0302009 A1 | | 12/2008 | Frecon et al. |
| 2009/0007486 A1 | | 1/2009 | Corradi |
| 2009/0223126 A1 | | 9/2009 | Garner et al. |
| 2011/0107667 A1 | * | 5/2011 | Laurence ............... A01G 9/025 47/59 S |

FOREIGN PATENT DOCUMENTS

| | | |
|---|---|---|
| DE | 38 16 866 | 11/1989 |
| DE | 196 39 102 A1 | 12/2010 |
| EP | 0337085 | 10/1989 |
| FR | 2390926 | 12/1978 |
| FR | 2872382 | 1/2006 |
| FR | 2902602 | 12/2007 |
| GB | 2070403 | 9/1981 |
| GB | 2 239 155 | 6/1991 |
| GB | 2300099 | 10/1996 |
| GB | 2412558 | 10/2005 |
| GB | 2 457 537 A | 8/2009 |
| GB | 2475101 | 5/2011 |
| JP | 06228919 | 8/1994 |
| JP | 10-131216 | 5/1998 |
| JP | 2002027829 | 1/2002 |
| JP | 2003274751 A | 9/2003 |
| JP | 2003325052 | 11/2003 |
| JP | 2004-150214 | 5/2004 |
| JP | 2006-246844 | 9/2006 |
| JP | 2009169367 A | 7/2009 |
| KR | 100794671 | 1/2008 |
| WO | WO 2006/134938 | 12/2006 |
| WO | WO 2010/009505 | 1/2010 |

OTHER PUBLICATIONS

Fytogreen Australia web page screen shot entitled, "Modular Turf," http://www.fytogreen.com.au/products/verticalgarden/faq.html, Dated: Jun. 18, 2008, 6 pages.
Fytowall drawing entitled, "Typical Fytowall," Drawing TP 1, Dated Feb. 4, 2009.
Fytowall drawing entitled, "Typical Elevation," Drawing TP 2, Dated Feb. 4, 2009.
Fytowall drawing entitled, "Typical Side Elevation," Drawing TP 3, Dated Feb. 4, 2009.
Fytowall drawing entitled, "Typical Section Side Surround," Drawing TP 4, Dated Feb. 4, 2009.
Fytowall drawing entitled, "Suggested Drip Tray Configuration," Drawing TP 5, Dated Feb. 4, 2009.
Fytowall drawing entitled, "Typical Irrigation Cabinet Installation and Requirements," Drawing TP 6, Dated Feb. 4, 2009.
Fytogreen web page screen shot entitled, "Fytogreen > Vertical Gardens Home > Modular Turf," Dated Jun. 18, 2008, 2 pages, accessed from www.fytogreen.com.au.
Fytogreen web page screen shot entitled, "Fytogreen > Vertical Gardens Home > Vertical Turf," Dated Jun. 18, 2008, 2 pages, accessed from www.fytogreen.com.au.
International Search Report for related International Patent Application No. PCT/US2010/055866.
http://www.resike.co.uk/Add_Files/BioWall_Intro2.pdf (see p. 4).
International Preliminary Report on Patentability (Chapter II of the Patent Cooperation Treaty) dated Jan. 10, 2012.
International Preliminary Report on Patentability (Chapter II of the Patent Cooperation Treaty) dated Mar. 6, 2012.

* cited by examiner

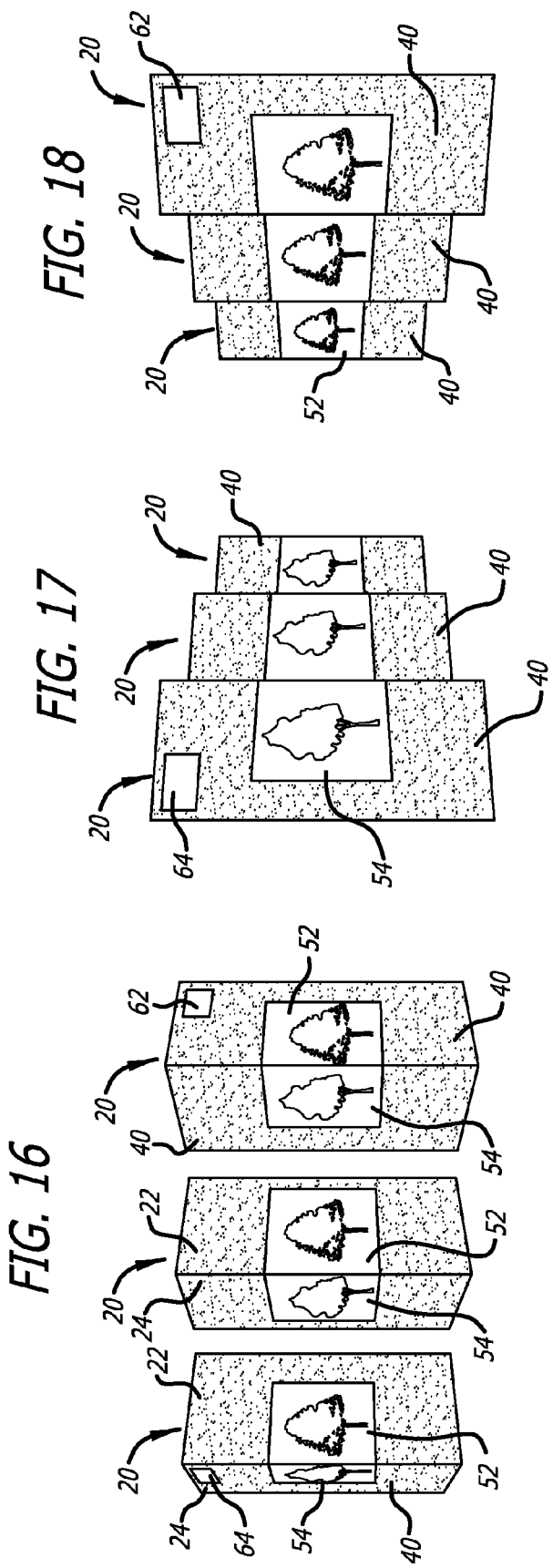

FIG. 19
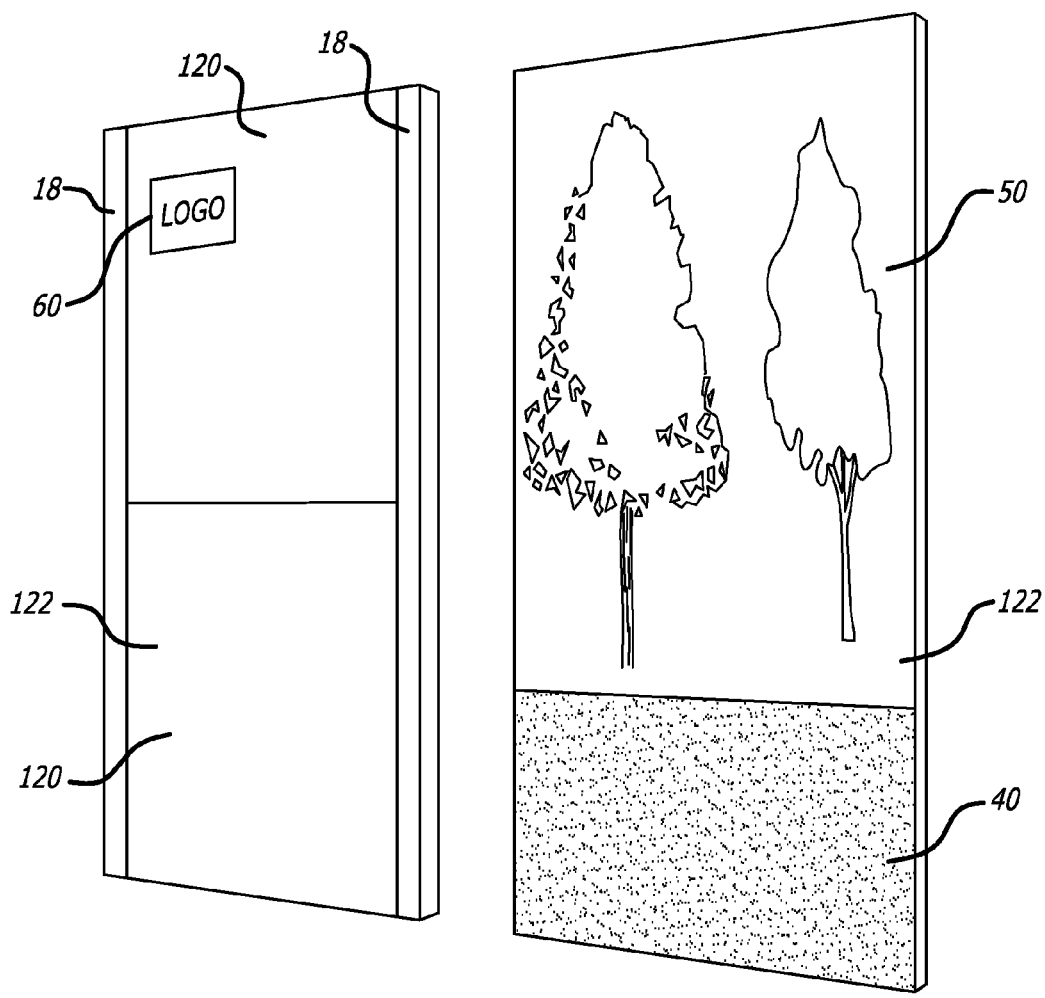
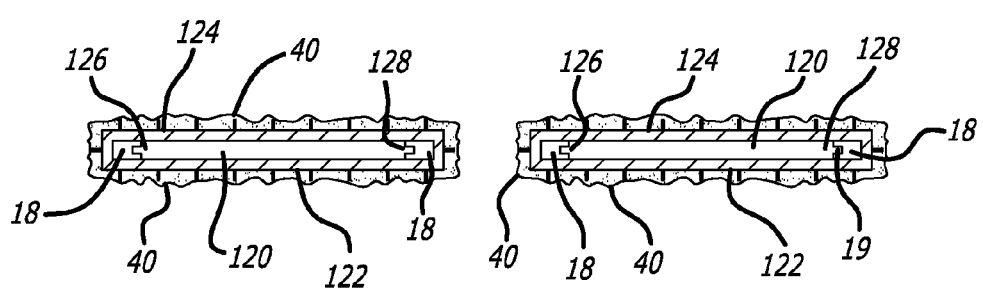
FIG. 20

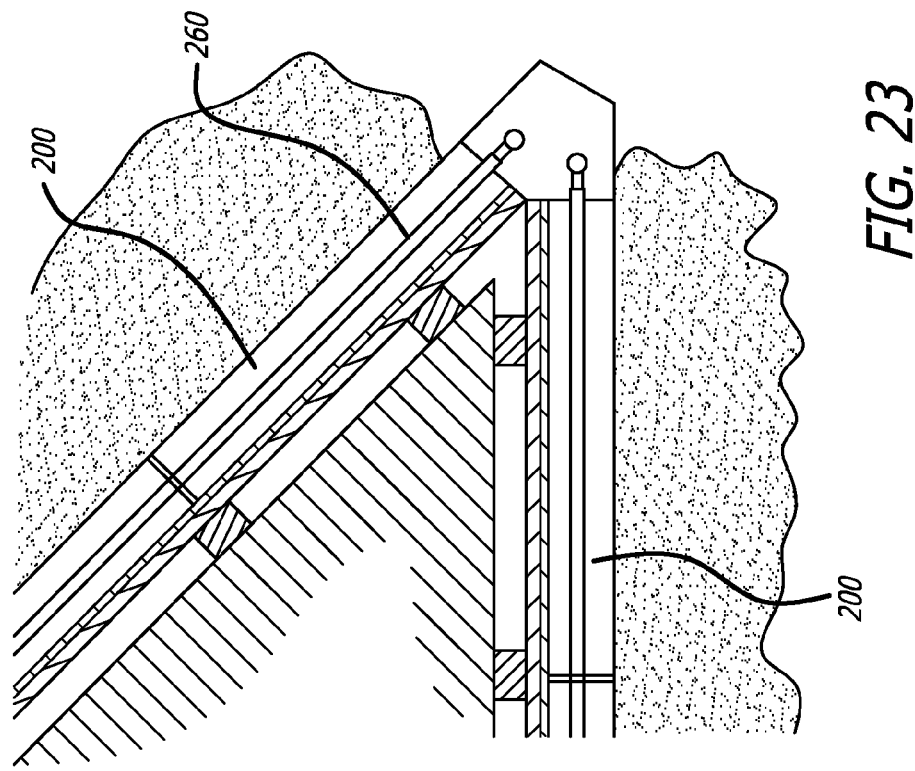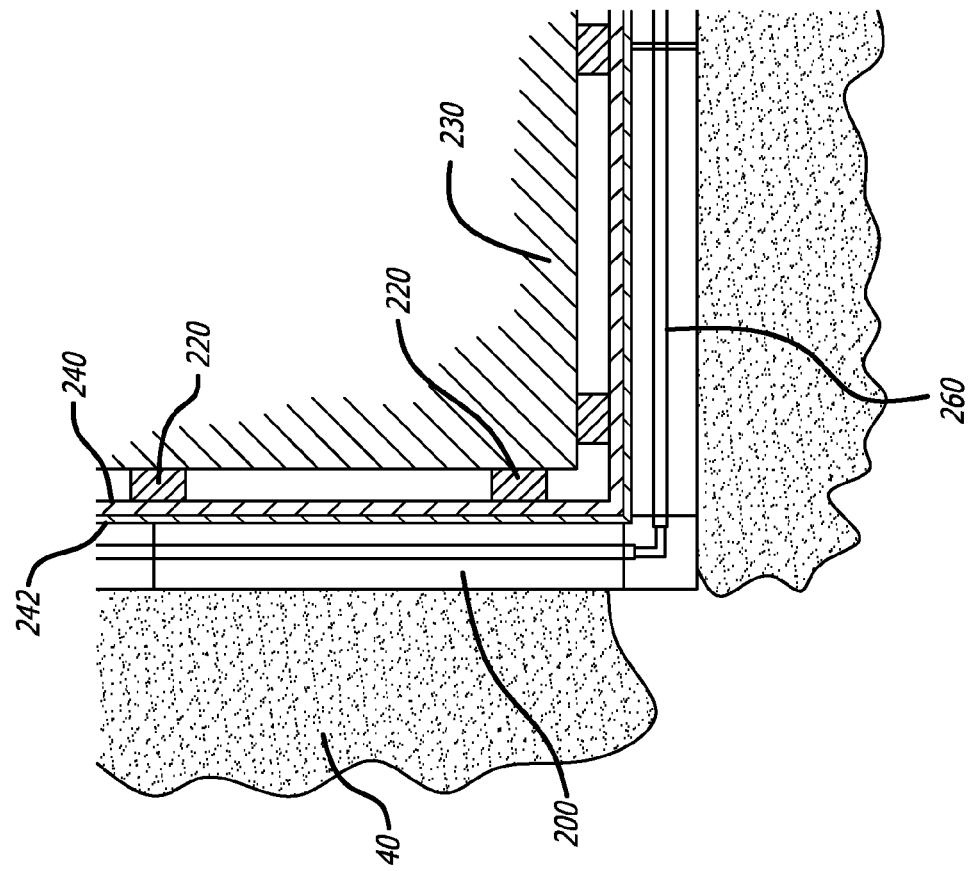
FIG. 23

FREE-STANDING VERTICAL STRUCTURES FOR DISPLAYING BOTANIC MEDIA

This application claims priority to provisional U.S. Patent Application No. 61/233,188 filed Aug. 12, 2009, the disclosure of which is herein incorporated by reference.

TECHNICAL FIELD

The present disclosure is directed to free-standing vertical structures for conveying information that include a plurality of plants, and which may include non-botanic media, such as traditional media, e.g., artwork, graphic design, or advertising materials, to form a new mixed media format for displaying information, herein referred to as botanic media.

BACKGROUND

Urban areas are by definition relatively densely inhabited environments. By necessity, such urban environments include closely-spaced buildings, and concrete and asphalt streets and sidewalks. All of these features of the urban environment reduce the amount of space ordinarily available for plants or other vegetation. This also contributes to what has been called the "heat island" effect.

In addition, urban areas are highly desirable environments for those who are marketing products and services to people away from their homes and residences. Urban areas provide sponsors and various organizations with the opportunity to market their goods or services to a large group of people, including environmentally friendly "green" messages, products or services, to provide public service announcements, or to provide advocacy groups a medium of communication.

Historically, sponsors and organizations have placed marketing and advertising messages for goods and services, public service announcements, and advocacy messages in areas where those announcements can be seen by the largest number of people. Ideal locations include busy arterial roads, interstate highways, or stadiums and arenas. However, for aesthetic reasons, restrictions on outdoor public service marketing have arisen in many urban and rural regions of the United States.

A need exists for a structure that provides ample space for messages in cities and other high traffic areas, the structure including live plants specially designed to adorn and improve the limited space available on the urban skyline. At the same time, a need exists for a structure that provides marketing, sponsorship, advertising, environmental, public service, or other message while also improving the surrounding environment, air quality, and carbon footprint.

SUMMARY

The teachings herein alleviate one or more of the above noted problems by providing a free-standing vertical structure that is an environmentally-friendly "green structure that employs sustainable materials and which also displays media information. The free-standing vertical structure helps to reduce the impact of the heat island effect in urban areas, improve air quality, and may serve as a habitat for animals, such as birds, insects or other small creatures. The structure also provides a unique medium in which organizations may display information in an earth-friendly way, which could itself improve or contribute to the perception that the particular organization is "green," supports sustainable business practices, and has implemented sustainable policies or initiatives.

In one exemplary structure, a free-standing vertical structure includes a base for securing the structure vertically and at least one walled element extending from the base. A plurality of plant modules are removably secured to at least a portion of the walled element. Each plant module removably secured to the walled element is configured to hold or carry a plurality of live, hydroponically-fed plants. The walled element further includes non-botanic media removably secured to at least a portion of the walled element. The non-botanic media is configured on the walled element to display information readily observable to those passing by the free-standing vertical structure. In a further example, at least a portion of the plurality of live, hydroponically-fed plants are configured on the walled element to display media information readily observable by a passerby.

In another aspect of the present disclosure, a free-standing, vertical structure for conveying information includes at least one walled structure extending vertically from a base and forming a substantially hollow free-standing structure, the walled structure including a plurality of live, hydroponically-fed plants removably securable to the thin-walled structure. The walled structure further includes non-botanical media removably secured to at least a portion of the walled structure. The non-botanic media is configured to convey information that is readily perceivable by a passersby. The free-standing structure further includes an irrigation system for supplying water and nutrients to the plurality of plants.

In a further exemplary solution, a free-standing vertical tower for conveying information includes a base for vertically securing the structure and a wall that extends vertically from the base and forms a substantially hollow tower. A plurality of plant modules are removably secured to the wall. Each plant module includes a plurality of live, hydroponically-fed plants held in the plant panels. The plants are configured to grow outwardly in a substantially horizontal direction from the wall. The wall also includes non-botanical media removably secured to a portion of the wall that is configured on the wall to convey information readily perceivable by a passerby. In one example, at least a portion of the plurality of plants are configured to display botanic media information readily observable to a passerby.

In other examples, the free-standing vertical structure may include at least two walled elements stacked upon each other. In another example, the wall structures may comprises a planar panel. The wall structures may also be substantially circular or triangular in cross-section. The free-standing vertical structures may also take the form of a substantially hollow cylindrical tower or a substantially hollow polygon. In another example, the plurality of plants and/or the non-botanic media are configured to display a first set of information when viewed from a first direction and a second set of information when viewed from a second direction. In other examples, the wall structures and wall element may be comprised of at least one of pre-cast concrete, poured concrete, metal, alloy, or wood.

Additional advantages and novel features will be set forth in part in the description which follows, and in part will become apparent to those skilled in the art upon examination of the accompanying drawings, or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements. In addition, reference to dimensions, such as height, width, or length, are merely exemplary and other suitable dimensions other than those shown may be utilized and understood by those of skill in the art.

To understand the present teachings, it will now be described by way of example, with reference to the accompanying drawings in which:

FIG. 16 is a front elevation of one configuration of wall structures according to the present disclosure.

FIG. 17 is a left-side elevation of the structures shown in FIG. 16.

FIG. 18 is a right-side elevation of the structure shown in FIG. 16.

FIG. 19 is a front elevation of another example of a free-standing structure according to the present disclosure.

FIG. 20 is a cross section of the structure shown in FIG. 19.

FIG. 23 is a cross section of an exemplary wall structure and panel modules according to the present disclosure.

DETAILED DESCRIPTION

Figure 1:
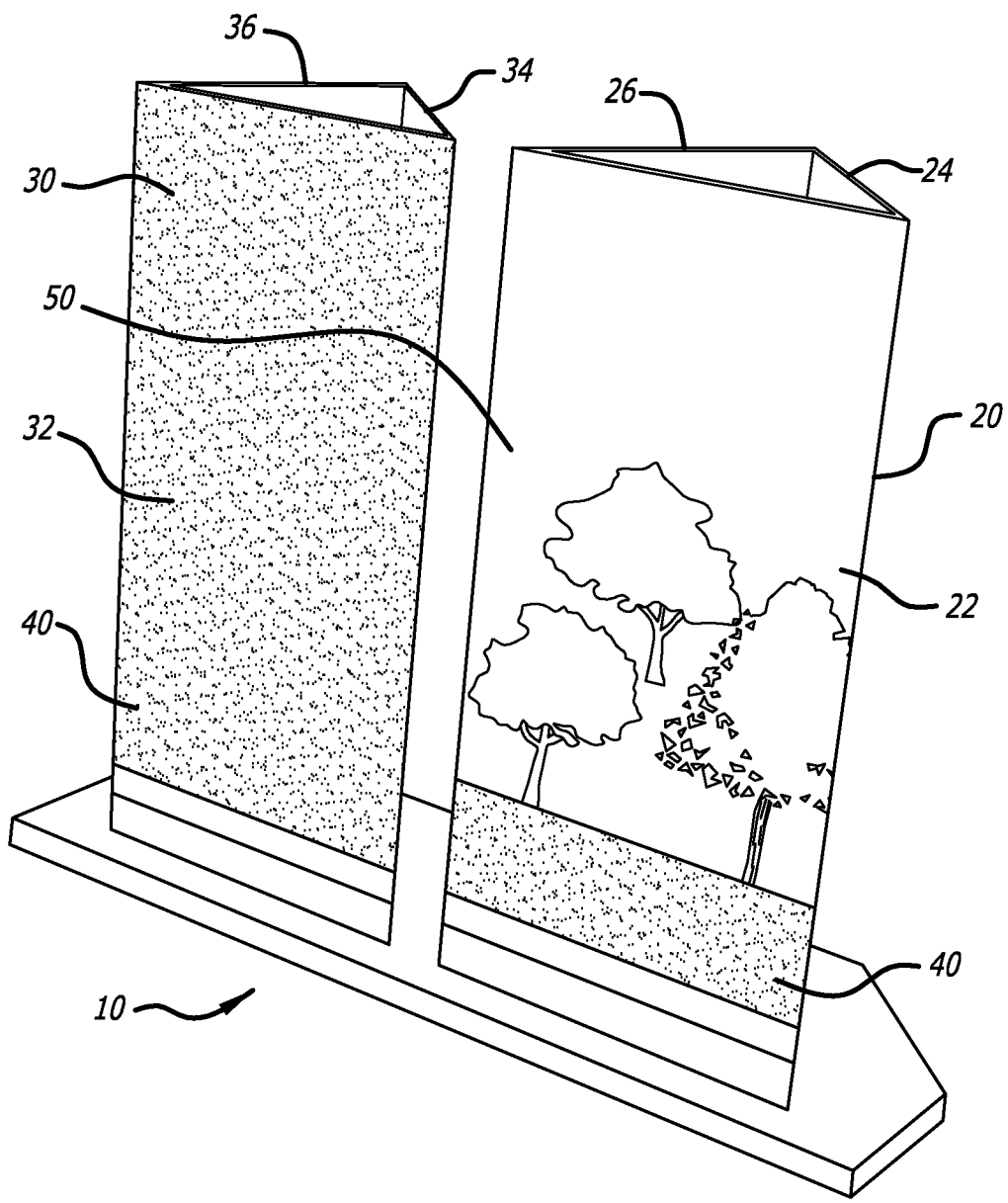
FIG. 1 illustrates a front elevation of a free-standing structure having two walled structures of triangular cross-section according to one example of the present disclosure.

In the following detailed description, numerous specific details are set forth by way of examples in order to provide a thorough understanding of the relevant teachings. While the present disclosure and teachings described herein are susceptible of embodiments in many different forms, preferred embodiments are shown in the drawings and will be described herein in detail with the understanding that the present disclosure is to be considered an exemplification of the principles and teachings discussed herein and are not intended to limit the broad scope of the disclosure and teachings disclosed. However, it should be apparent to those skilled in the art that the present teachings may be practiced without such details. In other instances, well known methods, procedures, and/or components have been described at a relatively high-level, without detail, in order to avoid unnecessarily obscuring aspects of the present teachings.

The examples disclosed herein provide a free-standing vertical structure for conveying information which includes a plurality of live plants removably secured to the structure. The free-standing structure may take various configurations to conveniently display and convey information that is readily perceivable by those passing by the structure, whether by automobile, bus, train, motorcycle, scooter, bicycle, skateboard, moving walkway, or foot. The plurality of live plants may cover at least a portion of the structure. The plants may also be configured to display information which could be readily perceived by those passing by the structure. The information conveyed by the configuration of the plants may take the form of logos, letters, print, images, graphics, or any other type of information that could be created using a single plant, or combinations of different plants, including flowers and other forms of vegetation, such as moss, and any combination thereof. The plants may be of any type and will be selected based upon their suitability for the environment and climate in which the structure resides.

In addition, the structure may include information in the form of non-botanic media, such as traditional media, e.g., artwork, graphic design, or advertising materials, which conveys information that could also be readily perceivable by those passing by the structure. The non-botanic media may take the form of a graphics media element which includes, but is not limited to, artwork, logos, letters, print, images, graphics, video, or any other type of information currently known or developed hereafter. The plurality of plants may be configured to display information in combination with non-botanic media and/or serve as background or framing for the non-botanic media that in combination create a new mixed media form, herein referred to as botanic media, that displays and conveys information from a sustainable structure and in such a way that benefits the environment.

The free-standing vertical structure provides an environmentally friendly "green" structure for conveying information that employs sustainable materials, such as live plants and inert growing mediums that hold the live plants. The structure helps to improve the heat island effect when located in cities, air quality, and creates a potential habitat for birds, insects, other small animals to live, as well as other advantages readily recognized by those skilled in the art. As a result, the free-standing vertical structures as described herein are useful for conveying advertisements, marketing information, or other information, while serving as a environmentally friendly alternative to conventional advertising structures, such as billboards or other advertisement structures. The structure of the present disclosure may also be used as sound barriers, walls for the creation of parks and/or gardens, and other structures and may convey artistic expression and information in addition to or as an alternative to advertisement or marketing information.

The free-standing structures of the present disclosure may extend to heights that range from about several feet, for example about 10 feet, to about 100 feet. Preferably, the structures extend to heights of about 15 to about 80 feet. In addition, although not shown in the drawings, it is contemplated that the free-standing vertical structures described herein will include an access, such as a doorway, to the inside of the structure. The inside of the structure may include various mechanical and/or electrical systems, such as the irrigation and drainage systems described herein and systems for lights positioned on or adjacent to the structure, such as the lights shown in FIG. 22.

One example of a free-standing vertical structure of the present disclosure is shown in FIG. 1. A base 10 secures the first wall structure 20 and a second wall structure 30 vertically. The first wall structure 20 and second wall structure 30 extend from the base 10 vertically to positions above the base 10. Base 10 may be configured and dimensioned to support one wall structure, two wall structures, as shown in FIG. 1, or three or more wall structures. Wall structure 20 is secured to the base 10 using any suitable connectors, such as metal plates secured, for example by welding, to the wall structure. First and second wall structures 20, 30 may be comprised of a single wall element or a plurality of wall elements or panels, such as those shown in FIGS. 2 and 4, and described below.

The vertically extending wall structures 20, 30 includes a first side 22, 32, second side 24, 34 and third side 26, 36, respectively. As shown in FIG. 1, the first side 22, 32 of the wall 20 includes a plurality of plants 40 removably secured to the first sides 22, 32. The first side 22 also includes non-botanic media 50 that conveys information, such as video, graphics, print, audio, images, logos, or any other media information. The non-botanic media is configured to be readily perceived by those passing by the wall structure 20. The second sides 24, 34 and third sides 26, 36 may also includes a plurality of plants 40 and/or non-botanic media 50, and any combination thereof. Generally, sides of the walls 20, 30 not including a form of non-botanic media 50 will include a plurality of plants 40.

Figure 2:
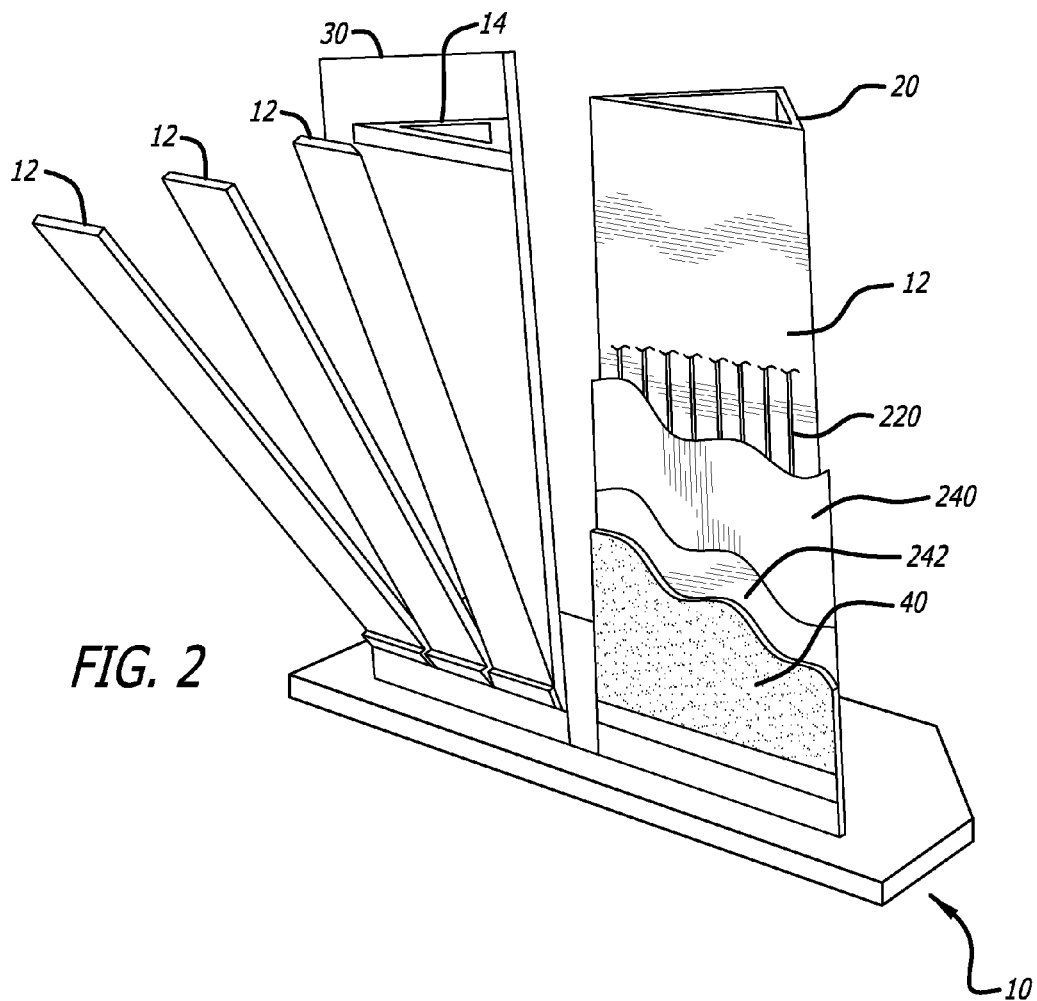
FIG. 2 illustrates a front elevation cut-away view of one example of the free-standing structure according to the structure shown in FIG. 1.

FIG. 2 illustrates one example of forming the free-standing vertical structure of the present disclosure. As shown in FIG. 2, first and second wall structures 20, 30 may be comprised of a plurality of wall panels 12 vertically secured to the base 10. The wall panels 12 extend vertically from the base and are positioned adjacent to each other to form the first, second, and third sides of each wall structure. Any number of wall panels 12 may be positioned adjacent to each other to form a side of the wall. The wall panels 12 are secured together near the upper portion of the structure by a tube 14, which may be formed of metal or other suitable structure to which the wall panels 12 are welded, secured by bolts, or by any other suitable physical, mechanical, or chemical connection. The panels 12 are secured to tube 14 in such a way as to create a hollow vertical structure. The panels 12 may have a thickness of any suitable dimension required to give strength and stability to the structure. In one example the panels are about 10 inches thick, but may range from about 8 to about 12 inches thick.

Figure 3:
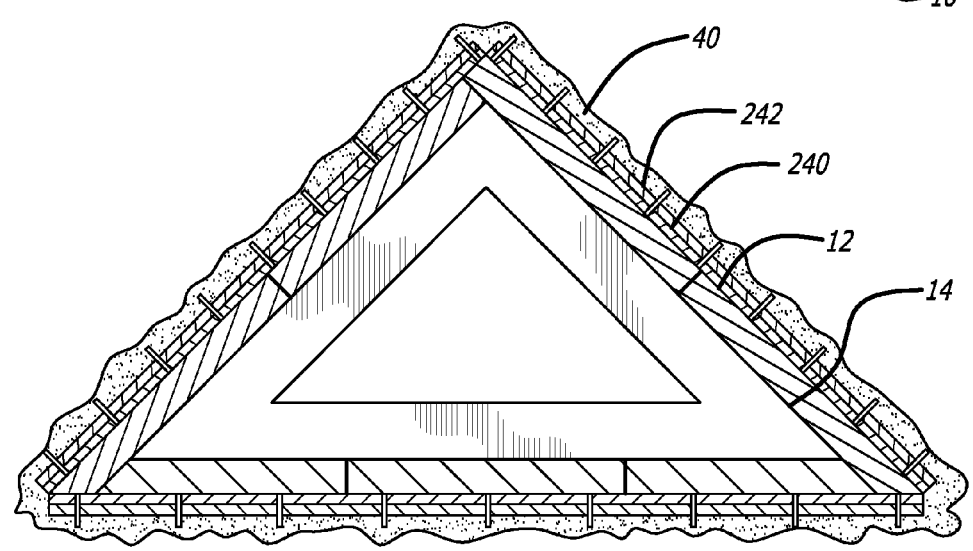
FIG. 3 is a cross-section of the structures shown in FIG. 2.

FIGS. 2 and 3 further illustrates an example of mounting a plurality of plants 40 to the wall structures 20, 30. As described in more detail below, rails 220 are secured to the wall panels 12 and extend vertically and form a supporting structural frame. A water-proof backing board 240 is secured to the rails 220 and serves as an additional part of the supporting structural frame. The backing board 240 prevents water from passing through the board 240 and contacting the wall panels 12. A drainage mat 242 is further attached to the backing board 240, which allows water to pass therethrough and drain from the plants 40. The plurality of plants 40 are secured to wall structures by rails 220 with the backing board 240 and drainage mat 242 positioned therebetween. Non-botanic media 50 may also be secured to the rails 220 and/or backing board 240, or may be secured directly to the wall panels 12.

Figure 4:
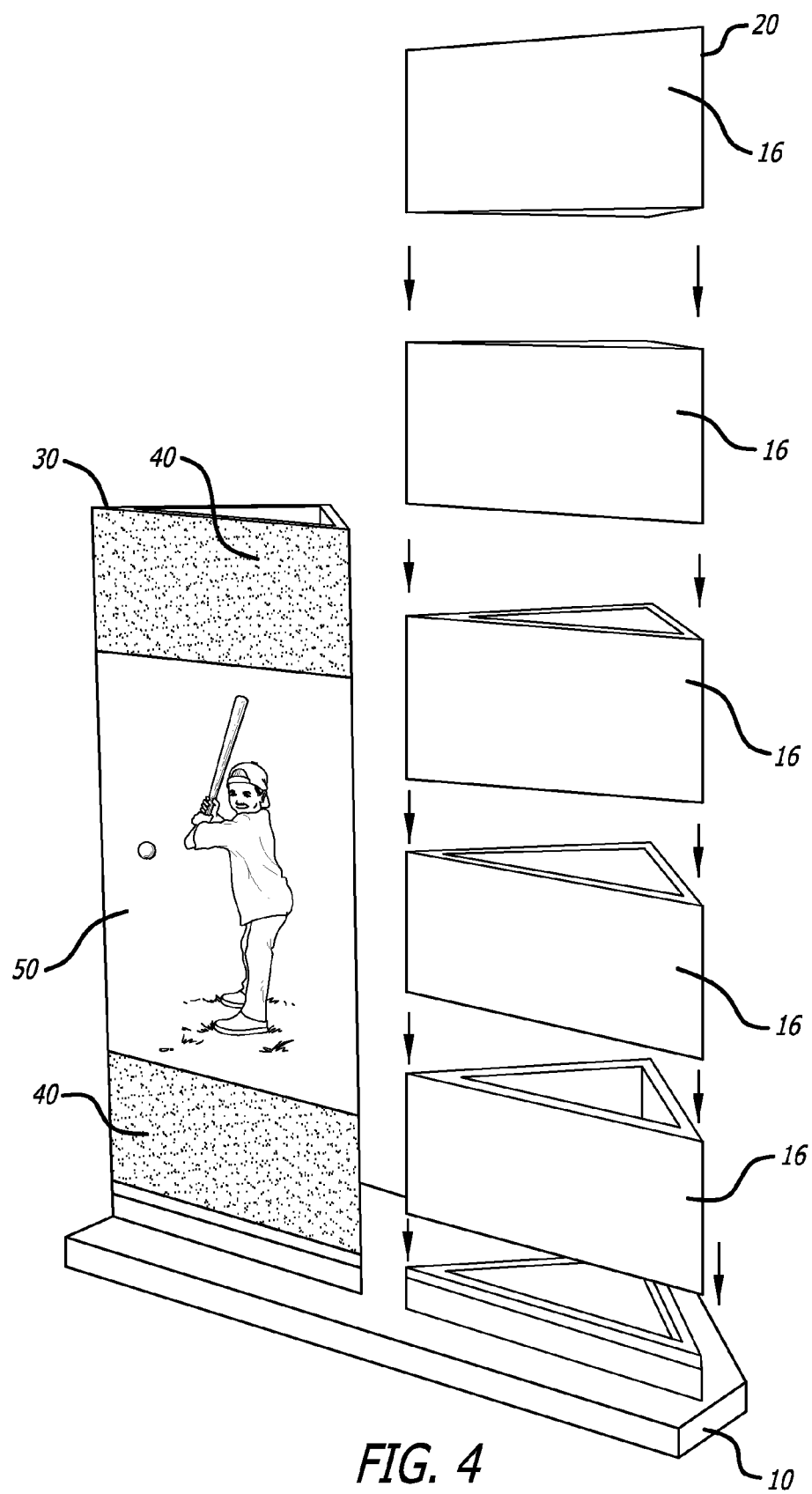
FIG. 4 illustrates a front elevation and exploded cut-away view of another example of the free-standing structure according to the structure shown in FIG. 1.
Figure 5:
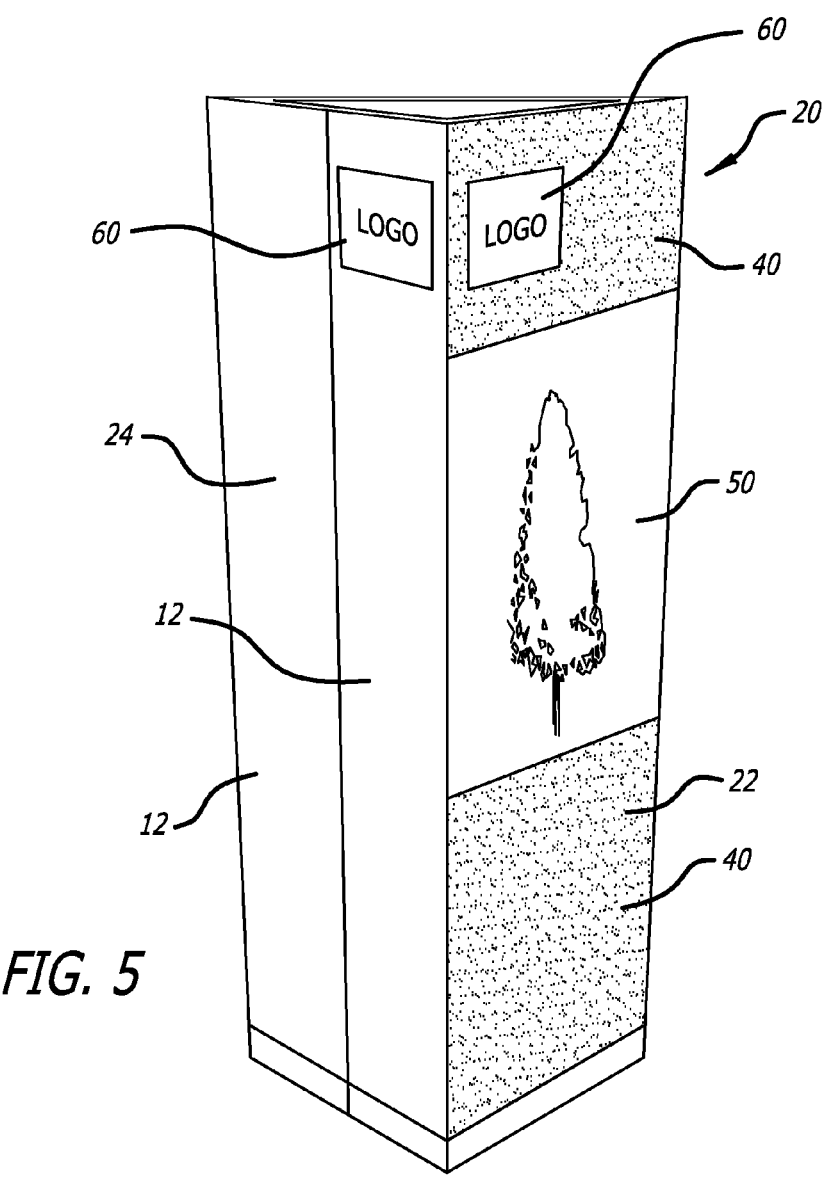
FIG. 5. illustrates one example of a front elevation of a free-standing structure having a substantially triangular cross-section according to the present disclosure.
Figure 6:
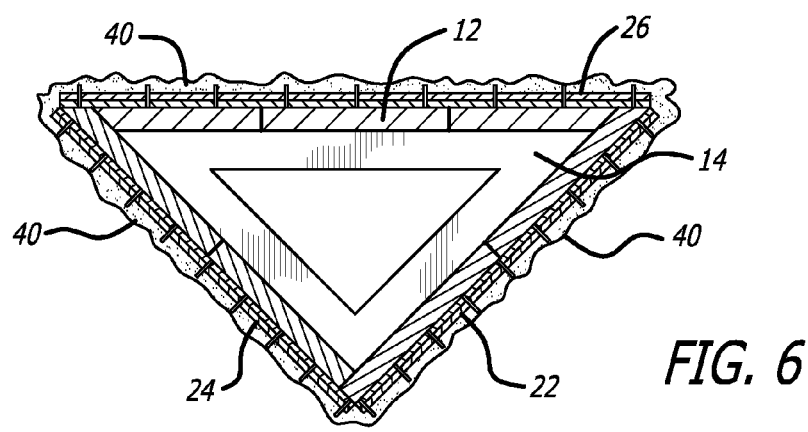
FIG. 6 is a cross section of the structure shown in FIG. 5.
Figure 7:
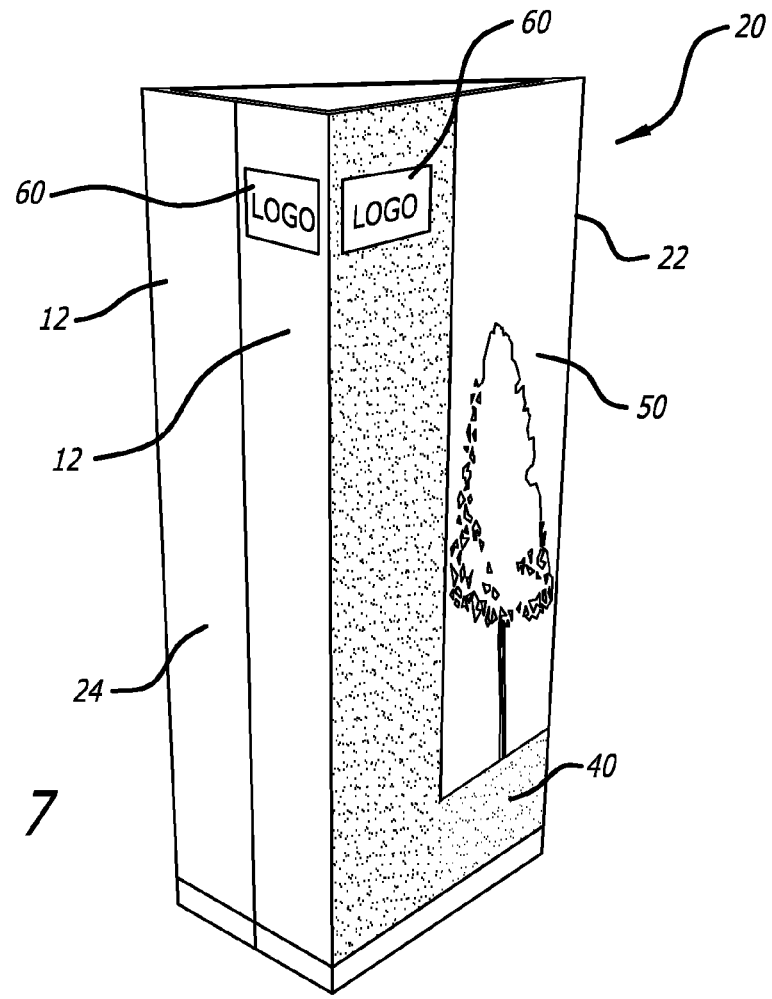
FIG. 7. illustrates another example of a front elevation of a free-standing structure having a substantially triangular cross-section according to the present disclosure.
Figure 8:
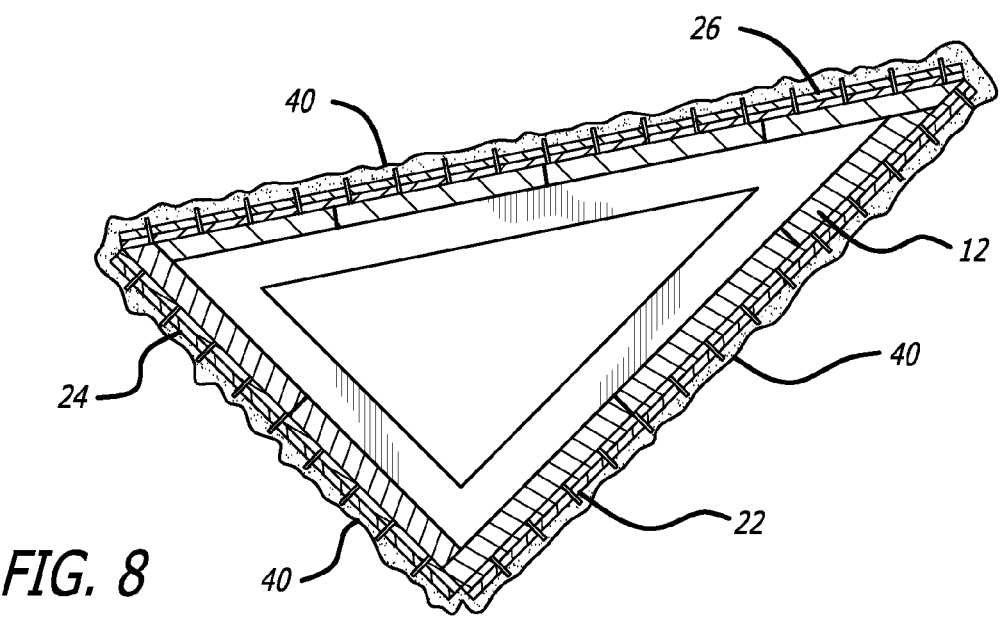
FIG. 8 is a cross section of the structure shown in FIG. 7.

As shown in FIG. 4, another example of forming the free-standing vertical structure includes a base 10 that secures first wall structure 20 and second wall structure 30 vertically. The first wall structure 20 and second wall structure 30 extend from the base 10 vertically to positions above the base 10. Base 10 may be configured and dimensioned to support one wall structure, two wall structures, as shown in FIG. 4, or three or more wall structures. Wall structure 20 is secured to the base 10 using any suitable connectors, such as metal plates secured, for example by welding, to the wall structure. As shown in FIG. 4, first and second wall structures 20, 30 may be comprised of a plurality of wall elements 16, which have a hollow interior, and are vertically stacked one on top of the other. For example, as shown in FIG. 4, wall structure 20 is shown as an exploded component view and includes walled elements 16 vertically stacked one on top of the other to form the wall structure 20, 30. The walled elements 16 may be secured together by, for example metal plates welded to the wall structure, or any other suitable physical, mechanical, or chemical connection for securing together adjacent walled elements. Any number of walled elements 16 may be utilized to create wall structures 20, 30 to achieve a desired height of the structure. Second wall structure 30, as shown in FIG. 4, includes a plurality of plants 40 removably secured to two portions of the wall 30. Non-botanic media 50 is also removably secured to the wall structure 30. Any configuration of plants 40 and non-botanic media 50 may be included on the wall structures 20, 30 to convey and display information.

Another example of a free-standing vertical structure of the present disclosure is shown in FIGS. 5-8. A vertically extending wall structure 20 includes a first side 22, second side 24, and third side 26. The first side 22 of the wall 20 includes a plurality of plants 40 removably secured to the first side 22. The first side 22 also includes non-botanic media 50 that conveys information, such as video, graphics, print, audio, images, logos, or any other information. The non-botanic media is configured to be readily perceived by those passing by the wall structure 20. The first side 22 and second side 24 further may include an additional media element 60. The media element 60 may take the form of a brand, logo, print, image, graphic, or other similar media element. The media element 60 may be formed by configuring a subset of the plurality of plants 40 to create the media element 60. The subset of plants may be selected for attributes such as color of flowers or leaves, and be arranged to create media element 60. Media element 60 may also be created using non-botanic media, such as that described above, or a combination of the subset of the plurality of plants and non-botanic media. In one example, the media element is made from brushed aluminum that may be backlit by a light source, such as light-emitting diodes. The second side 24 also includes a plurality of plants 40 and media element 60 (only shown in FIGS. 6 and 8). Media element 60 on the second side 24 may be the same or different from the media element included on the first side 22. The portions of the sides 22, 24, and 26 not including non-botanic media information include a plurality of plants 40. The dimensions of the triangular free-standing vertical structures shown in FIGS. 5-8 are exemplary, and any suitable dimension of the sides, angles, lengths, heights, or widths may be utilized to form the structures of the present disclosure.

As shown in FIGS. 5-8, first wall structure 20 may be in the shape of a triangle in cross-section. The central portion of the wall structure 20 is hollow. The wall structure 20 is formed from panels 12 which are configured to create the hollow triangular-cross section. Alternately, the wall structure 20 may also be formed from walled elements 16 as shown in FIG. 4. The triangular-shaped structure 20 allows passersby to observe the structure from many different angles, and to perceive information conveyed therefrom. The information conveyed from the structure may be observed from about 360° around the structure. For example, in this way, the same information may be displayed and/or conveyed from each side of the structure such that those passing by the structure from different directions would readily perceive the same information from viewing angles extending 360° around the structure. In another example, different information may be displayed and/or conveyed from each side of the structure, depending on the location of the structure relative to potential passersby.

Figure 9:
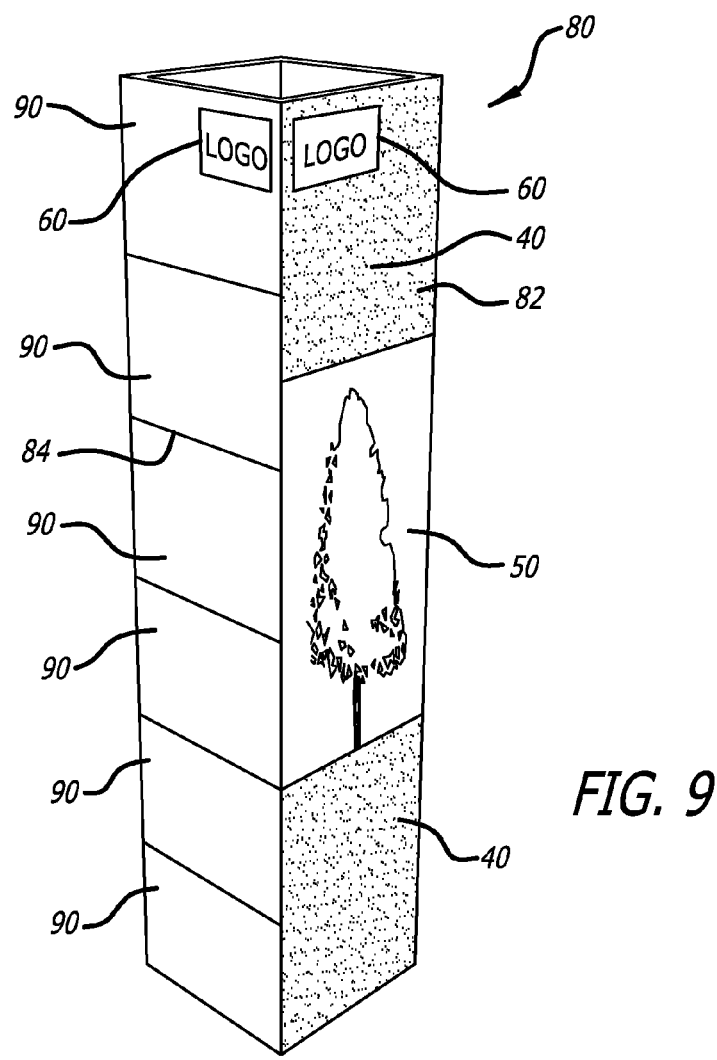
FIG. 9 illustrates a front elevation of a free-standing structure having a substantially square cross-section according to the present disclosure.
Figure 10:
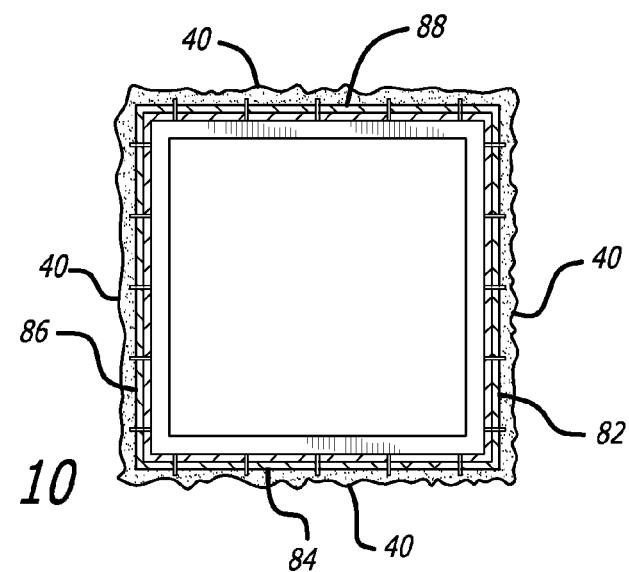
FIG. 10 is a cross section of the structures shown in FIG. 9.

In addition to triangular-shaped structures, wall structures may take the form of any shape or configuration to create the free-standing vertical structure of the present disclosure, such as wall structures having cross-sections in the shape of circles, and other polygons besides triangles. For example, as shown in FIGS. 9 and 10, a rectangular-shaped wall structure 80 is illustrated. The wall structure 80 has four sides 82, 84, 86, and 88. The structure 80 may include any combination of plants 40, non-botanic media 50, and/or media elements 60, as described above. The wall structure 80 preferably includes plants 40 on all four sides and on the portions of the wall not including non-botanic media (as shown in FIG. 10). As shown, non-botanic media is included on side 82, and media elements 60 on at least sides 82, 84 of the structure 80. The information conveyed from the structure may be observed from about 360° around the structure as described above.

The rectangular-shaped structure 80 may be comprised of a single wall element or a plurality of wall elements vertically stacked one on top of the other (FIG. 9) or panels arranged vertically side-by-side (such as the example shown in FIG. 2). For example, as shown in FIG. 9, wall structure 80 includes walled elements 90 vertically stacked one on top of the other to form a hollow wall structure. The walled elements may be secured together by metal plates welded to each other and the walled elements or other suitable connectors for securing together adjacent walled elements. Any number of walled elements 90 may be utilized to create a wall structure 80 to achieve a desired height of the structure. The wall structure 80 may extend vertically from base (not shown). The dimensions of the free-standing vertical structures shown in FIGS. 9 and 10 are exemplary, and any suitable dimension of the sides, angles, lengths, heights, or widths may be utilized to form the structures of the present disclosure.

Figure 11:
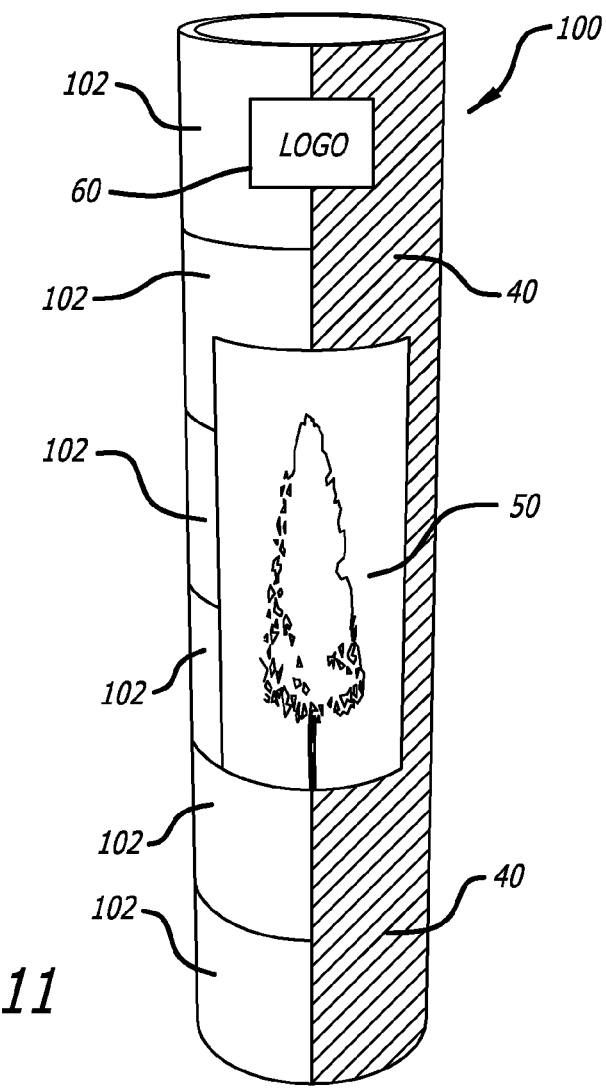
FIG. 11 illustrates a front elevation of a free-standing vertical structure having a substantially circular cross-section according to the present disclosure.
Figure 12:
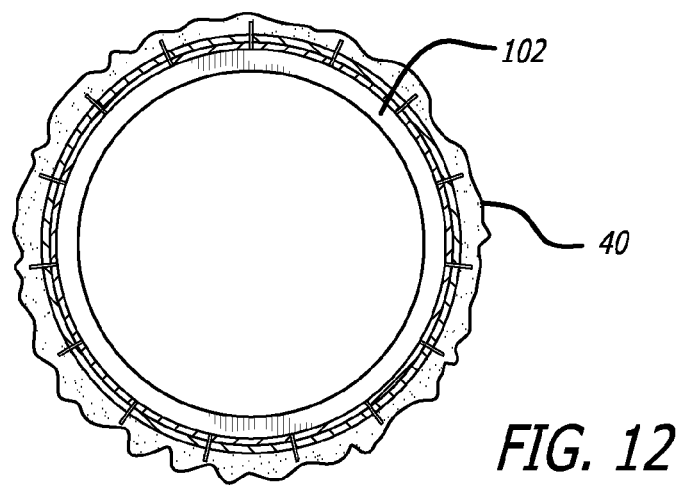
FIG. 12 is a cross-section of the structure shown in FIG. 11.

Another example of the free-standing vertical structure of the present disclosure is a substantially circular-shaped structure 100, as shown in FIGS. 11 and 12. The wall structure 100 is circular and may include plants 40, non-botanic media 50, and/or media elements 60, and combinations thereof, as described above. As shown, the wall structure includes plants around the circumference of the wall structure 100 (as shown in FIG. 12, and partially shown in FIG. 11), non-botanic media 50 around a portion of the wall structure 100, and media elements 60. The substantially circular-shaped structure may be comprised of a single wall element or a plurality of wall elements structures vertically stacked one on top of the other. For example, as shown in FIG. 11, wall structure 100 includes walled elements 102 vertically stacked one on top of the other to form a hollow wall structure. The information conveyed from the structure may be observed from about 360° around the structure. The walled elements may be secured together by welding metal plates to the walled elements or other suitable connectors for securing together adjacent walled elements. Any number of walled elements may be utilized to create wall structure 80 to achieve a desired height of the structure. The wall structure 80 is secured to extend vertically from a base (not shown). The dimensions of the free-standing vertical structure shown in FIGS. 11 and 12 are exemplary, and any suitable dimension of the diameter, circumference, heights, or widths may be utilized to form the structures of the present disclosure.

Figure 13:
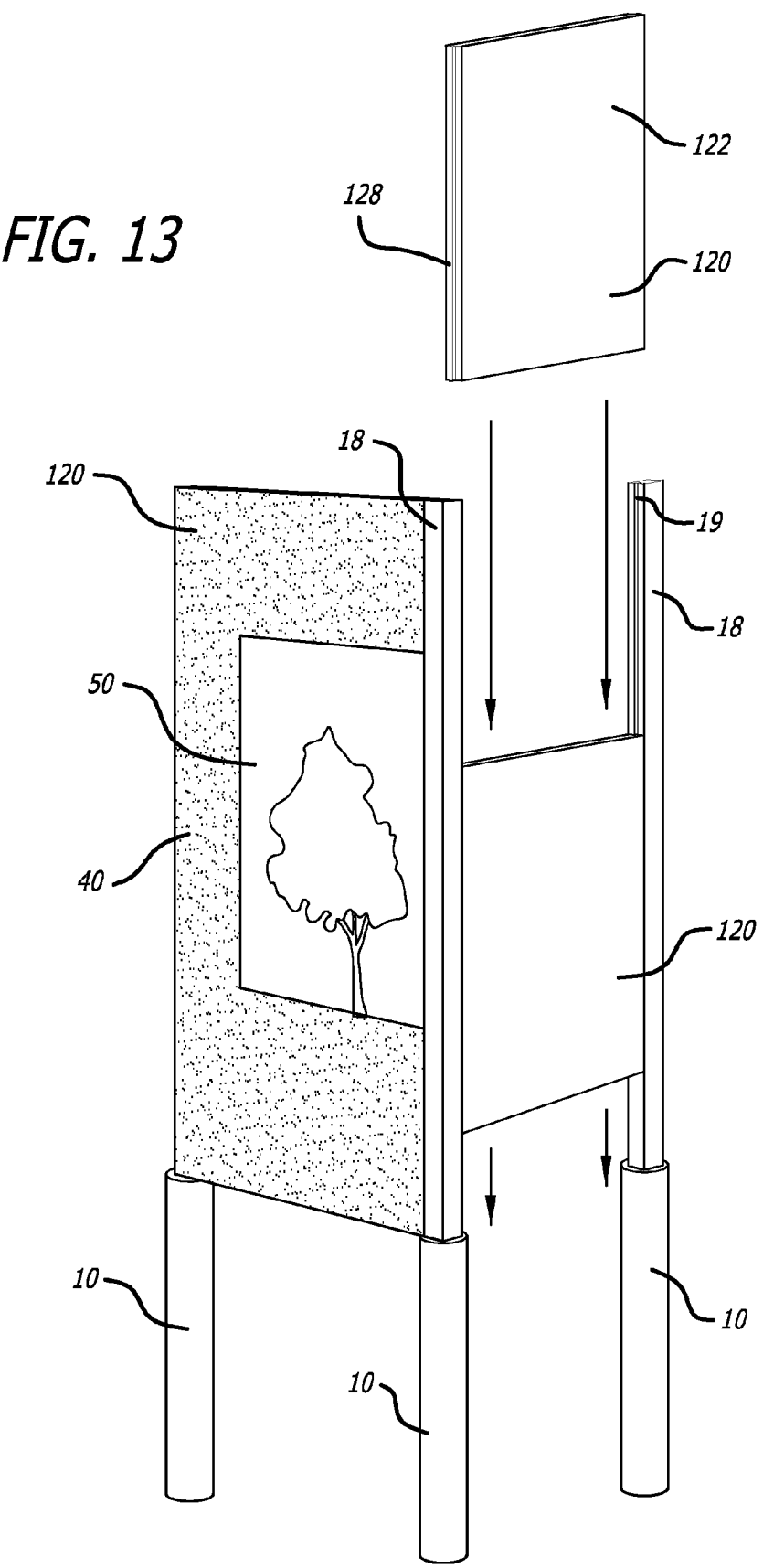
FIG. 13 is a front elevation of a free-standing structure comprised of planar walls according to the present disclosure.
Figure 14:
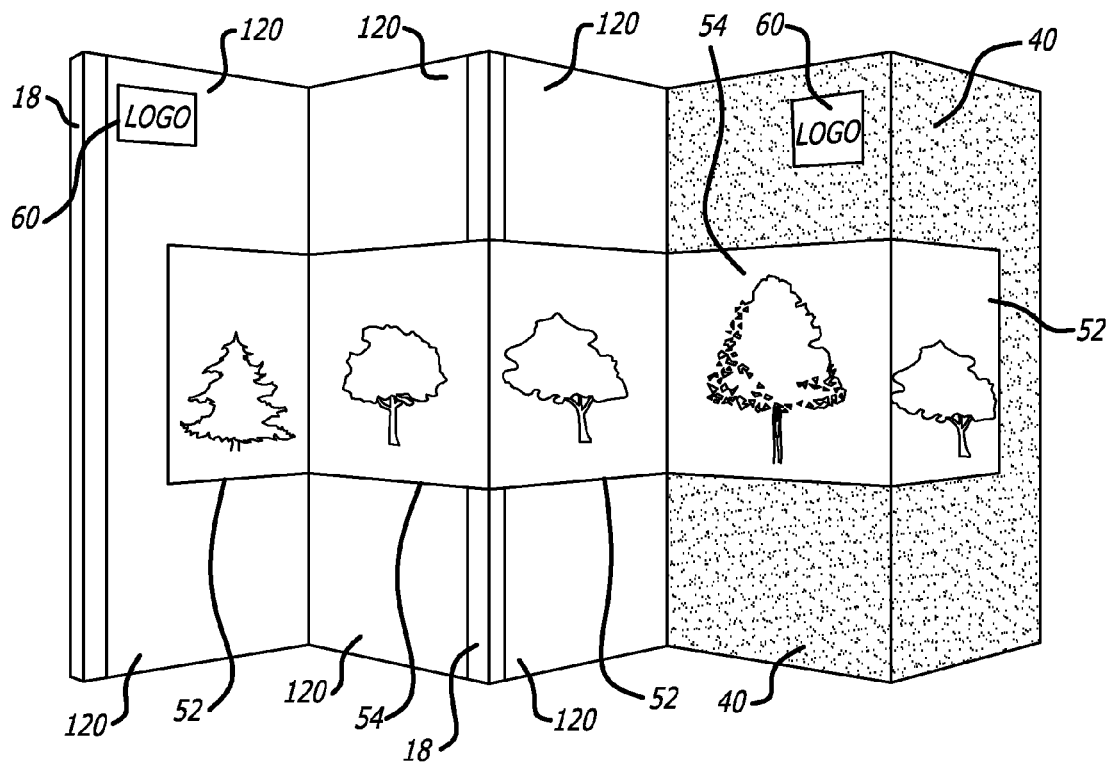
FIG. 14 is a front elevation of a free-standing structure configured in a zig-zag according to the present disclosure.
Figure 15:
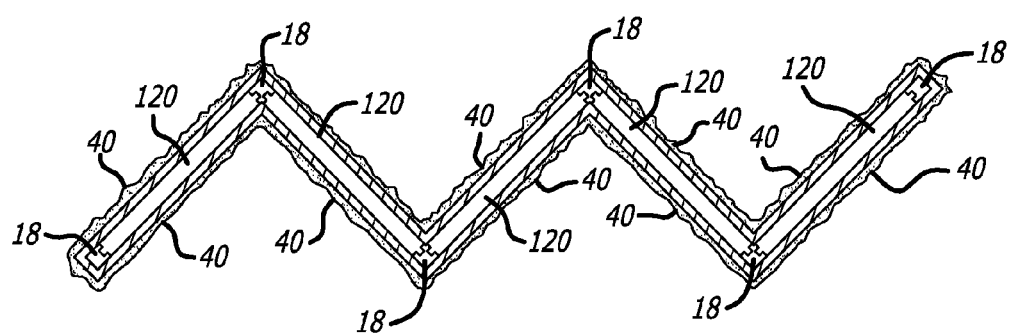
FIG. 15 is a cross section of FIG. 14.

A further example of the free-standing vertical structure of the present disclosure is shown in FIGS. 13-15, in which a plurality of planar wall structures 120 are positioned at angles relative to each other. A base 10 secures the wall structure 120, so that the wall structure 120 extends vertically above the base 10. The base 10 may include a single structure for securing the wall structure 120 vertically or a plurality of structures, such as shown in FIG. 13. The base members 10 include cylindrical piers which vertically secure pilasters 18. Any suitable base 10 can be used to vertically secure the wall structures 120. The pilasters 18 each extend vertically from the respective bases 10 to which they are attached. Each pilaster 18 includes a channel 19 which is configured to receive a wall structure 120 or a plurality of wall structures 120. The pilasters 18 may be configured to receive a single wall structure 120 or a plurality of wall structures 120. The wall structures 120 include a front face 122, rear face 124 (not shown), and two side faces 126 and 128. The channels 19 are configured to receive and secure the side faces 126, 128. Each face 122 and 124 may include plants 40, non-botanic media 50, and/or media elements 60 (not shown), and combinations thereof, as described above. As shown in FIG. 13, front face includes plants 40, non-botanic media 50, and media element 60. Preferably, the portions of the faces 122, 124, 126, and 128 not including non-botanic media 50 or media elements 60 include plants 40.

In another example of the free-standing vertical structure of the present disclosure, a plurality of planar wall structures 120 are configured in a zig-zag configuration, such as that shown in FIGS. 14 and 15. The planar wall structures 120 are secured together at angles by pilasters 18, each of which are vertically secured by a single base or plurality of bases 10 (not shown). The planar wall structures 120 include plants 40 (as shown in FIG. 15, and partially shown in FIG. 14), non-botanic media 50, and media elements 60. The non-botanic media 50 is configured on the wall structures to create and convey a multi-image effect. The wall structures 120 include a portion of a first set of information 52 or a portion of a second set of information 54. The wall structures when viewed from a first direction convey the first set of information 52, and convey a second set of information 54 when viewed from a second direction. The first and second sets of information may be the same or a different set of information to create a multi-image effect (such as that shown in FIGS. 16-18 described below). The media elements 60 may also be configured so as to convey a first set of information 62 (as shown in FIGS. 16-18) when viewed from a first direction and a second section of information 64 (also as shown in FIGS. 16-18) when viewed from a second direction. The dimensions of the free-standing vertical structure shown in FIGS. 13-15 are exemplary, and any suitable dimension of the sides, angles, lengths, heights, or widths may be utilized to form the structures of the present disclosure.

In another example of creating a multi-image effect, triangular wall structures 20 may be placed one next to the other, as shown, for example in FIGS. 16-18. The wall structures 20 include a first side 22 including a first set of information 52 and a second side including a second set of information 54. The wall structures also include a third side 26 (not shown). When viewed from a first direction, the wall structures convey the first set of information 52 (FIG. 18), and convey a second set of information 54 when viewed from a second direction (FIG. 17). Any number of wall structures 20 may be positioned adjacent to one another to create and convey a multi-image effect. The wall structures also include a plurality of plants 40. The wall structures may also include media elements 60 configured to convey a first set of information 62 when viewed from a first direction and a second section of information 64 when viewed from a second direction.

The free-standing vertical structure of the present disclosure may also include planar walls 120 configured adjacent to one another in a row, as shown in FIGS. 19 and 20. A base 10 (not shown) secures the wall structures 120 vertically. Pilasters 18 are vertically secured by the bases 10, and each pilaster 18 vertically extends from the respective bases 10 in which they are secured. Any suitable base and pilaster configuration may be utilized, or any suitable base for vertically securing wall structures 120 without pilasters may be used. The pilasters 18 include channels 19 configured to receive wall structures 120, as described above. As shown in FIGS. 19 and 20, the wall structures may be spaced apart, but wall structures may also be abutted against one another to form a continuous planar wall structure of any desired length. The dimensions of the free-standing vertical structure shown in FIGS. 19 and 20 are exemplary, and any suitable dimension of the sides, angles, lengths, heights, or widths may be utilized to form the structures of the present disclosure.

The wall structures 120 include a front face 122, rear face 124, and two side faces 126 and 128. The front and rear faces may each include plants 40 (as shown in FIG. 20, and partially shown in FIG. 19), non-botanic media 50, and/or media elements 60, and combinations thereof, as described above. The side faces may include plants when placed on the ends of the free-standing vertical structure. As shown in FIGS. 19 and 20, front face includes plants 40, non-botanic media 50, and a media element 60, on portions of the structures 120, as described above. The remainder of the wall structures 120 not including non-botanic media 50 include plants 40, as shown in FIG. 20 and partially shown in FIG. 19.

As shown in FIGS. 1-12 and 16-18, the free-standing vertical structures are preferably constructed of walled elements that have substantially hollow interiors or constructed of panels to form a substantially hollow free-standing structure. The walled elements and panels allow the structure to be portable, such that it may be assembled at one location, disassembled and transported to a different location, and subsequently reassembled at the new location. The walled elements and panels also allow the structure 20 to be constructed at a low cost. The walled elements and panels may be made of pre-cast concrete, poured concrete, wood, tile, metal, steel, aluminum, alloy or alloys, combinations thereof, or any other suitable materials or combination of materials that allow the free-standing vertical structure to be disassembled and transported as components. Preferably, the walled elements and panels are made of pre-cast or poured concrete.

Figure 21:
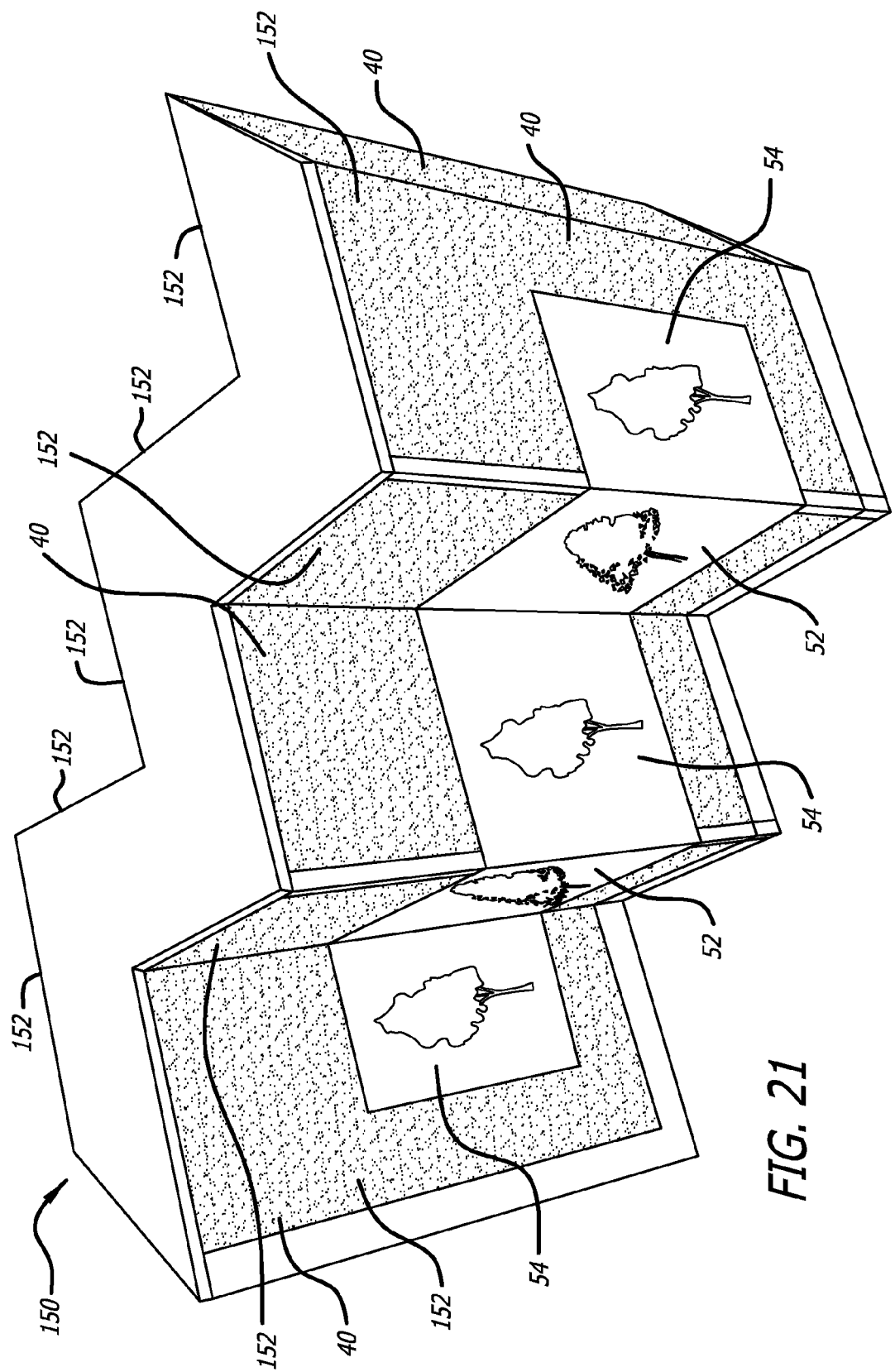
FIG. 21 is another example of a free-standing structure according to the present disclosure.

Another example of a free-standing vertical structure of the present disclosure is shown in FIG. 21. The free-standing structure 150 is configured to be free-standing without the use of a base or other support structure and is of a suitable dimension and thickness to achieve a free-standing configuration. The structure 150 includes a plurality of sides 152 which may include a plurality of plants 40, non-botanic media 50, and media element 60 as described herein. As shown in FIG. 21, wall structure 150 includes a first set of information 52 and a second set of information 54. When viewed from a first direction, the wall structure 150 conveys the first set of information 52, and conveys a second set of information 54 when viewed from a second direction. The wall structures also include a plurality of plants 40. The wall structures may also include media elements 60 (not shown) configured to convey a first set of information when viewed from a first direction and a second section of information when viewed from a second direction. The dimensions of the free-standing vertical structure shown in FIG. 21 are exemplary, and any suitable dimension of the sides, angles, lengths, heights, or widths may be utilized to form the structures of the present disclosure.

Figure 22:
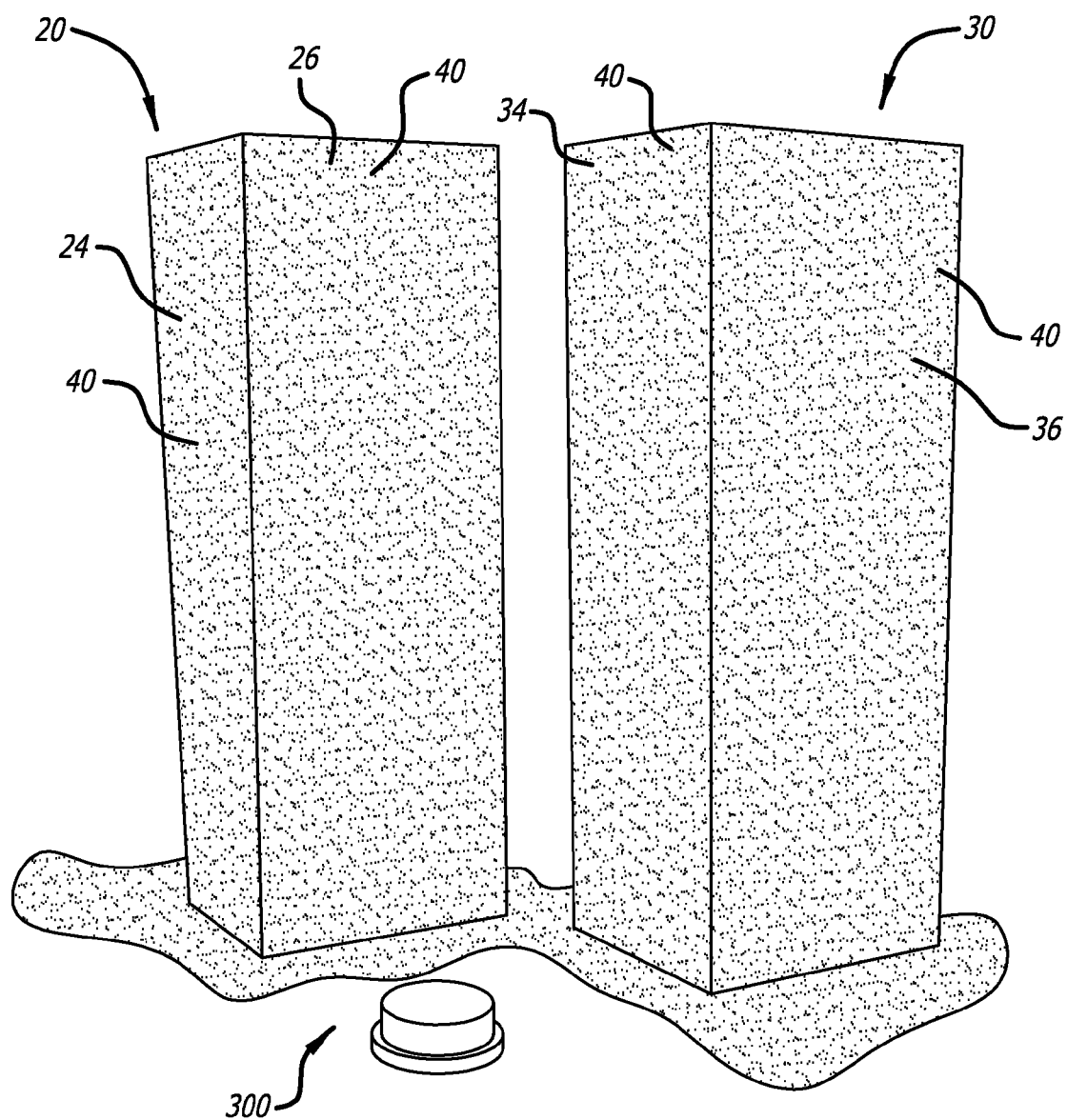
FIG. 22 illustrates a rear view of the exemplary structure as shown in FIG. 1 integrated into the surrounding environment.

FIG. 22 illustrates an example of free-standing structures, as shown in FIG. 1, integrated into a surrounding environment, such as a park. The free-standing structures 20, 30, include a first side 22, 32 (shown in FIG. 1), second side 24, 34 and third side 26, 36, respectively. As shown in FIG. 22, second sides 24, 34 and third sides 26, 36 of the walls 20, 30 include a plurality of plants 40 removably secured thereto. A park 300 is formed adjacent to the structures 20, 30. It is contemplated that the free-standing structures may be placed in any surrounding environment, and may be utilized to create surrounding environments, such as the park 300 shown in FIG. 22. As shown, the park 300 may include trees, flowers, bushes, grasses, benches, walkways, fountains, lights, or any other structures, plants, or elements found in parks. It will be understood that the first side 22, 32 (not shown) preferably includes non-botanic media that conveys information, such as video, graphics, print, audio, images, logos, or any other media information. The non-botanic media is configured to be readily perceived by those passing by the wall structures 20, 30.

Figure 24:
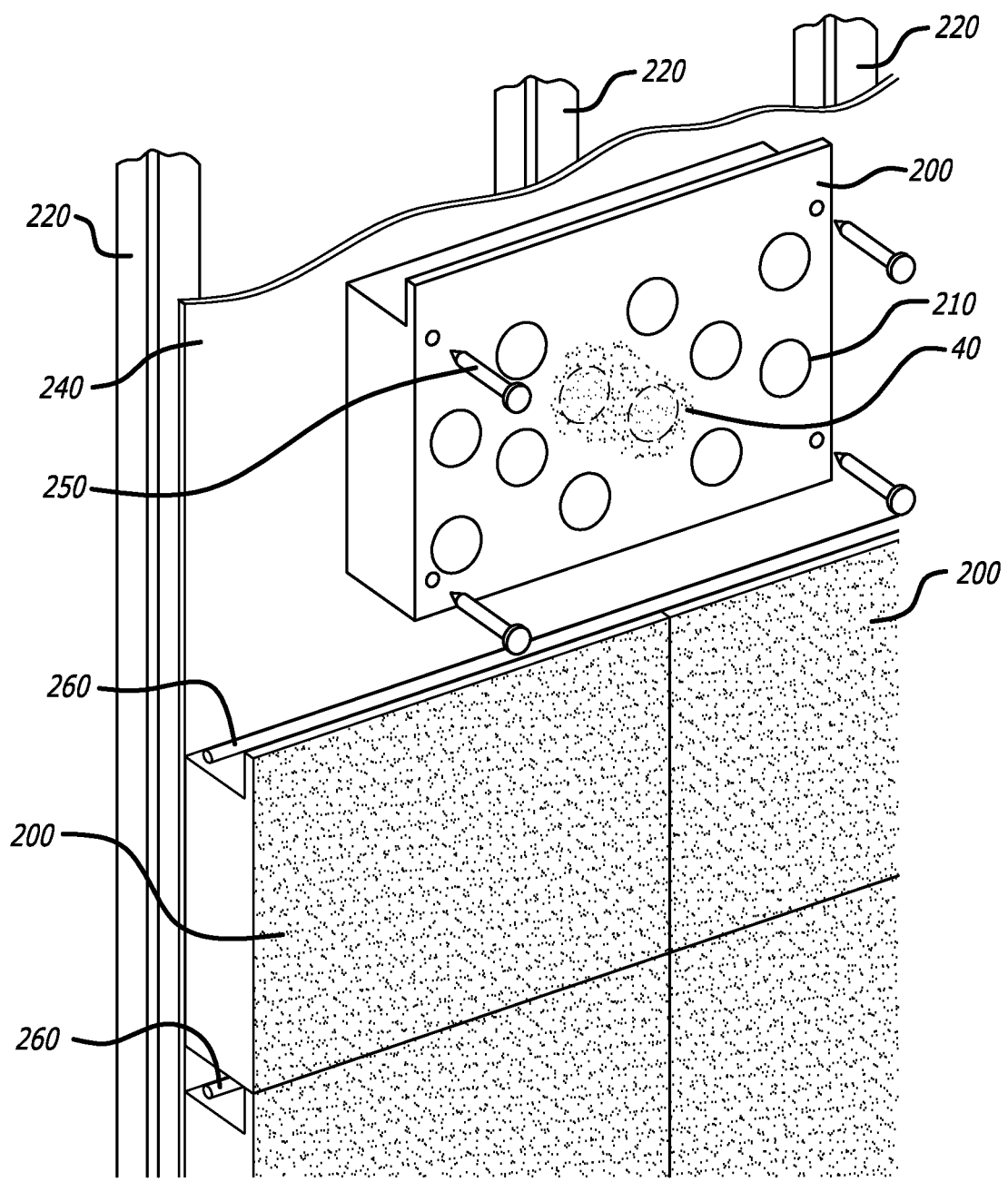
FIG. 24 is an elevation showing exemplary panel modules according to the present disclosure.

The plurality of plants 40 are removably secured to the walled structures. In one example, as may be seen in FIGS. 23 and 24, the plants 40 are removably secured to the walls by utilizing a plurality of plant modules 200 which hold a plurality of plants therein. As shown in FIGS. 23 and 24, rails 220 are secured to a wall structure 230, such as those wall structures described herein, and provide a support structure for plant modules 200. These rails 220 collectively provide for a supporting structural frame that is secured or otherwise attached or placed adjacent to the wall structures 230. Mounted to the rails 220, and serving as an additional part of the supporting structural frame, is a water-proof backing board 240. A plurality of plant modules 200 are removably secured to or otherwise placed upon the water-proof backing board 240 by a plurality of anchors 250. These anchors 32 are preferably made of a corrosion-proof material such as stainless steel, or alternatively, at least a highly corrosion-resistant material. These plant modules 200 carry or otherwise hold plants, and may also provide a support for an irrigation system for feeding of the plants. The plant modules 200 also include a drainage mat 242 which allows water supplied by the irrigation system to drain from the modules 200.

The plant modules 200 are shown as rectangular boxes, but may be of any shape or configuration. The plant modules 200 include openings 210 for receiving a plant or plurality of plants. The openings and plants are dimensioned such that the plants will be received snugly within the openings 210, or received such that the plants will not readily fall out or be removed from the openings 210. The plant modules may include an inert growing medium that does not decompose or that decomposes slowly over time. An exemplary inert growing medium that may be used is a mineral fiber based material, such as Gro/dan™ which is a dense horticultural form of Rockwool which has been used for commercially growing plants for over thirty years. The inert growing medium is capable of absorbing and storing water and nutrients fed to the panels by the irrigation system, such that the water and nutrients are delivered and distributed to the roots of the plants. The inert growing medium also reduces the amount of water needed for growing and maintaining plants by its ability to absorb and hold large amounts of water of extended periods of time. The plant modules permit the plants used in connection with the wall structure to be fed and nourished by natural nutrient solutions, without the use of soil. Any suitable hydroponic capable modules may be used, including but not limited to the BioTecture Living Wall, supplied by BioTecture Ltd. The Glasshouse, Street End Road, Sidlesham W. Sussex PO20 7QD, England.

As suggested above, the irrigation system comprises a hydroponic feeding system, which provides nutrients and water to the plants, and a drainage system. An example of such a hydroponic feeding system is shown in FIGS. 23 and 24. Irrigation pipes 260 extend between adjacent vertically arranged panel modules 200 to deliver water and nutrients to the modules 200. The inert growing medium absorbs the water and nutrients and delivers and distributes the water and nutrients to the individual plants held in openings 210. Water and nutrients may be supplied by any suitable pumping system, which may be connected to a utility supply of water and/or a reservoir of water. The irrigation system also includes suitable equipment to mix nutrients with water. Additional details of this suitable hydroponic-capable support structure can be found at the website noted above, Information on the BioTecture Living Wall can be obtained from the official website of BioTecture Ltd., biotecture.uk-.com. The home page of this website includes a menu at the top left. Accessing the tab entitled "BioTecture Biowall™" enables the user to access detailed drawings of the system shown in FIGS. 23 and 24 of the present specification.

Again, it is to be understood that the system of this FIGS. 23 and 24 is but one suitable hydroponic-capable support structure that may be used to irrigate and feed the plurality of plants. Other manufacturers are known to provide functionally equivalent hydroponic-capable support structures for use with the free-standing vertical structures described herein. In addition, it will be understood that non-hydroponic capable plant modules may be used for the plants placed on the wall structure as described herein. By this, it is meant that the system for the plants need not necessarily be a hydroponic feeding system.

The use of plant modules allows for individual modules to be removed, replaced; and rearranged on the wall structure. In this way, if plants whither or otherwise do not survive, individual modules may be replaced without having to replace the entire wall structure. In addition, individual plants may also be removed from the modules without having to remove an entire module. In other examples, the wall structure may include apertures or other areas for receiving and holding the plants directly without the use of panel modules. In yet another example, a combination of plant modules and areas formed in the wall structures may be utilized to hold plants vertically on the wall structure. Likewise, different media information may be provided on the wall structure by arranging and configuring the plant modules and the plants held thereon in a way that displays information created by the arrangement and configuration of the plants, such as images, graphics, words, logos, trademarks, or other images.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments and examples could be provided in any combination with the other embodiments and examples disclosed herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A free-standing vertical structure for conveying information comprising:
   a base for securing the structure vertically;
   at least one walled element extending vertically from the base;
   a plurality of plant modules removably secured directly to at least a portion of the walled element, each module including an inert growing medium and a plurality of vertically arrayed openings and a plurality of horizontally arrayed openings formed in the plurality of plant modules for holding a plurality of live, hydroponically-fed plants, the plurality of plants being planted in the inert growing medium, wherein the plurality of plant modules are configured on the walled element to allow individual plant modules to be removed from the walled element without removing any other plant modules and the plurality of plant modules are configured to allow individual plants planted in the inert growing medium to be removed without removing the plurality of plant modules from the walled element;
   a water proof backing board and a drainage mat each vertically extending along their respective entire heights in substantially parallel alignment with the at least one walled element, wherein the water proof backing board and drainage mat are positioned adjacent to each other, and wherein the water proof backing board is positioned adjacent to the at least one walled element and the drainage mat is positioned adjacent to the plurality of plant modules; and
   the walled element further comprising non-botanic media on at least a portion of the walled element, the non-botanic media comprising at least one graphics media element configured on the walled element to convey information not including instructions for use.

2. The structure of claim 1, further comprising an irrigation system for supplying water and nutrients to the plurality of plants.

3. The structure of claim 1, wherein the free-standing vertical structure comprises at least two walled elements adjacent to each other to form a hollow free-standing structure.

4. The structure of claim 1, wherein the walled element comprises a walled polygon having a substantially hollow interior.

5. The structure of claim 1, wherein the walled element comprises at least one planar panel.

6. The structure of claim 5, wherein the at least one planar panel has a zig-zag configuration.

7. The structure of claim 1, wherein the at least one walled element is comprised of at least one of pre-cast concrete, poured concrete, metal, alloy, or wood.

8. The structure of claim 1, wherein the at least one walled element is substantially circular in cross-section.

9. The structure of claim 1, wherein the at least one walled element is substantially triangular in cross-section.

10. The structure of claim 6, wherein at least one of the plurality of live plants or non-botanic media are configured to display a first set of information when viewed from a first direction, and a second set of information when viewed from a second direction.

11. The structure of claim 1, wherein at least one graphics media element comprises at least one of video or print.

12. A free-standing vertical structure for conveying information comprising:
    at least one walled structure extending vertically and forming a substantially hollow free-standing structure, the walled structure including a plurality of plant modules each including an inert growing medium and a plurality of vertically arrayed openings and a plurality of horizontally arrayed openings formed in the plurality of plant modules for holding a plurality of live, hydroponically-fed plants, each module removably secured directly to the walled structure, the plurality of plants being planted in the inert growing medium and configured to grow in the modules on the walled structure;
    a water proof backing board and a drainage mat each vertically extending along their respective entire heights in substantially parallel alignment with the at least one wailed structure, wherein the drainage mat is directly attached to the water proof backing board and is positioned adjacent to the plurality of plant modules;
    the walled structure further comprising non-botanic media on at least a portion of the walled structure, the non-botanic media comprising at least one graphics media element configured on the walled structure to convey information not including instructions for use; and
    an irrigation system for supplying water and nutrients to hydroponically feed the plurality of plants.

13. The structure of claim 12, wherein the at least one walled structure extends vertically to form a substantially hollow cylindrical tower.

14. The structure of claim 12, wherein the at least one walled structure extends vertically to form substantially hollow polygon.

15. The structure of claim 14, wherein the hollow polygon is triangular in cross-section.

16. The structure of claim 12, wherein at least one of the plurality of live plants or non-botanic media are configured to display a first set of information when viewed from a first direction, and a second set of information when viewed from a second direction.

17. The structure of claim 12, wherein at least one graphics media element comprises at least one of video or print.

18. The structure of claim 12, wherein the plurality of plant modules are configured on the walled structure to allow individual plant modules to be removed from the walled structure without removing other plant modules and the plurality of plant modules are configured to allow individual plants planted in the inert growing medium to be removed without removing the plurality of plant modules from the walled structure.

19. A free-standing vertical structure for conveying information comprising:
    a base for vertically securing the structure;
    a wall extending vertically from the base;
    a plurality of plant modules removably secured directly to the wall, each of the plurality of plant modules includes an inert growing medium and a plurality of vertically arrayed openings and a plurality of horizontally arrayed openings formed in the plurality of plant modules comprising a plurality of live, hydroponically-fed plants held in the openings of the plant modules such that the plurality of plants are planted in the inert growing medium and configured to grow outwardly in a substantially horizontal direction from the wall;
    a water proof backing board and a drainage mat each vertically extending along their respective entire heights in substantially parallel alignment with the wall, wherein the drainage mat is directly attached to the water proof backing board and is positioned adjacent to the plurality of plant modules; and
    the wall further comprising non-botanic media on at least a portion of the wall, the non-botanic media comprising at least one graphics media element configured on the wall to convey information not including instructions for use.

20. The structure of claim 19, wherein at least one graphics media element comprises at least one of video or print.

21. The structure of claim 19, further comprising an irrigation system for supplying water and nutrients to the plurality of plants.

22. The structure of claim 19, wherein at least one of the plant modules or the non-botanic media are configured to display a first set of information when viewed from a first direction, and a second set of information when viewed from a second direction.

23. The structure of claim 19, wherein the plurality of plant modules are configured on the wall to allow individual plant modules to be removed from the wall without removing other plant modules and the plurality of plant modules are configured to allow individual plants planted in the inert growing medium to be removed without removing the plurality of plant modules from the wall.

* * * * *